May 19, 1942.  W. E. McCULLOUGH  2,283,217
BEARING
Filed Dec. 5, 1938

Inventor
WILLIAM E. McCULLOUGH
By Ramsey, Kent, Chisholm and Lutz
Attorneys

Patented May 19, 1942

2,283,217

UNITED STATES PATENT OFFICE 2,283,217

BEARING

William E. McCullough, Detroit, Mich., assignor to Bohn Aluminum & Brass Corporation, Detroit, Mich., a corporation of Michigan Application December 5, 1938, Serial No. 243,960

7 Claims. (Cl. 308—237)

This invention relates to an improved bearing.

An object of the invention is to provide bearings of great durability that will stand up under extreme conditions of abuse, such as inadequate lubrication.

In carrying out the invention a bearing formed of an alloy which includes lead as a major component is first given a smooth finished surface by machining or any other suitable finishing operation, and a thin layer of lead is then electrolytically deposited on the smooth finished surface. This thin layer of lead is of high purity, is unbroken by seams or joints, and is firmly bonded to the underlying alloy.

These and other objects and advantages of the invention will become apparent as the description proceeds.

While preferred methods of carrying out the process are disclosed herein for purposes of illustration, it should be understood that various changes may be made without departing from the spirit of the invention as herein set forth and claimed. The process of manufacturing the bearings is claimed in a divisional application, Serial No. 292,638, filed August 30, 1939.

Figure 1:
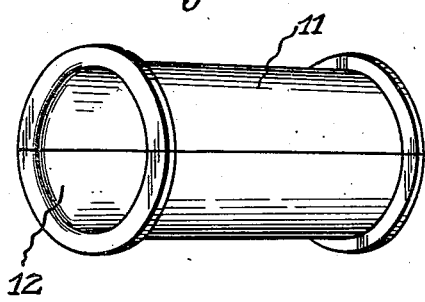
Fig. 1 is a perspective view of an interchangeable bearing embodying the present invention.

In manufacturing interchangeable bearings such as are used in automobile and aircraft engines, it is well-known practice to provide a backing of some relatively rigid material, such as steel, and to line the backing with a bearing material, such as the alloys of copper and lead, known in the art as "leaded-bronzes." In my copending application Serial No. 231,101, filed September 22, 1938, I have described a bearing in which a backing formed of a copper-nickel alloy, such as that sold under the trade-name "Monel metal," is lined with a bearing alloy comprising silver and lead. The present invention may be used with either of these types of bearings.

The lead alloys of both copper and silver give quite satisfactory service under ordinary conditions, but the present invention insures an output of improved bearings having uniformly long life as well as the ability to survive under extreme conditions of improper lubrication.

In carrying out the invention the bearing is first lined, and its inner surface is next given by machining, or any other suitable process, a smooth, highly accurate surface conforming in shape to the shaft surface but with a slightly increased clearance allowing for the film of lead, which is then electrolytically deposited on the finished surface of the bearing alloy. The thickness of the lead film, which is usually about one thousandth of an inch (0.001), is regulated so as to just take up the clearance that was provided for it.

In the example illustrated in the drawing, a body 10 of lead-containing bearing alloy has been formed, preferably by a spinning operation, on the inside of the shell 11, steps being taken to insure a strong bond between the bearing alloy 10 and the shell 11. These bearings are usually formed in cylindrical or semi-cylindrical shape, and after they have been suitably rough finished the surface of the bearing alloy which is designed to carry the load is machined to a smooth accurate surface, in this case to a cylindrical contour and with a diameter large enough to allow for the subsequent addition of a film of lead.

The bearing is then subjected to an electrolytic treatment suitable for depositing on the smooth prepared surface of the bearing alloy a thin film of pure lead, preferably not over 0.001 of an inch in thickness. The conditions of the electrolysis can be accurately controlled to produce a film of lead of thickness predetermined to exactly compensate for the excess clearance left when finishing the surface of the body 10. The lead film is illustrated on an exaggerated scale at 12 in the drawing.

Figure 2:
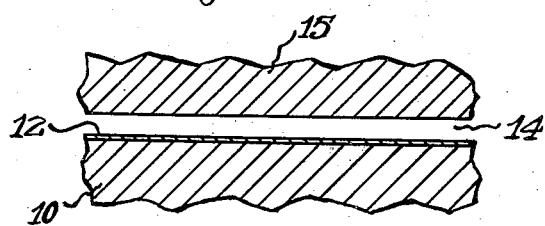
Fig. 2 is a fragmentary longitudinal section of the bearing shown in Fig. 1 in combination with a shaft.
Figure 3:
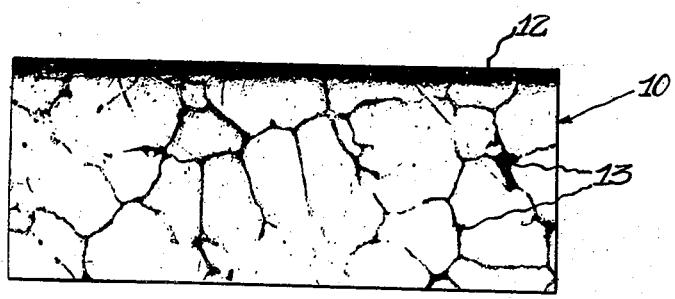
Fig. 3 is a reproduction of a photomicrograph showing on a greatly enlarged scale the structure of a partial section of a bearing taken on the same line as Fig. 2.

Fig. 3 is a reproduction of a photomicrograph taken at a magnification of 50X of part of the section of Fig. 2, and illustrates the structure of a bearing in which a thin film 12 of electrolytic lead is deposited on a layer 10 of a silver-lead bearing alloy. In this view the dark areas 13 are the lead component of the silver-lead alloy, and the figure shows clearly that wherever the lead areas of the bearing alloy were exposed at the plating surface the plated lead united with the lead component of the alloy to form a homogenous lead mass. As the lead molecules are deposited they unite to form a molecularly continuous surface, and they also form a molecularly continuous mass with lead portions of the bearing alloy.

The silver-lead bearing alloys may contain from 5 to 30% of lead, the remainder being substantially all silver, but at present it appears that best results are obtained with alloys containing from 15 to 20% lead, the remainder being substantially all silver.

Figure 4:
Fig. 4 is a view similar to Fig. 3 but showing the structure when a different material is used and at a higher magnification.

Fig. 4 is a reproduction of a photomicrograph taken at a magnification of 200X of a bearing in which a film 12 of electrolytic lead is deposited on a layer 10 of a copper-lead alloy, and here again it is evident that the electrolytic lead has united homogeneously with lead portions 13 of the copper-lead alloy. Satisfactory bearings may be made from copper-lead alloys containing from 15 to 50% of lead.

Fig. 2 illustrates a typical relation of bearing to shaft according to this invention for aircraft motors. In such motors a typical bearing of average size is at present designed to have a clearance of three thousandths (0.003) of an inch on a side, which clearance is shown at 14 between the bearing and the shaft 15. The film of electrolytic lead, shown at 12, is approximately one thousandth (0.001) of an inch thick, as previously explained.

When bearings made according to this invention are "run in" under operating conditions in the presence of lubricating oil, they all with practically no exception acquire the hard, glassy surface over the entire bearing area which is the sign of a good bearing. The hard surface results from the formation of a lead compound under the conditions of operation. The composition of this lead compound is not definitely known, but results prove that the presence of the thin film of pure electrolytic lead insures the formation of this perfect surface condition on all bearings, whereas when the lead bearing alloys are used without the electrolytic lead film a certain proportion of bearings fail to acquire the desired bearing surface, and must be replaced after relatively short periods of service.

It has been found that bearings thus formed are able to run for extended periods of time without showing any appreciable signs of wear on the lead film. It has also been found that such bearings are able to survive severe conditions of inadequate lubrication such as might result from the failure of the normal oil supply. It is believed that these superior operating characteristics of the improved bearing are due to the fact that electrolytically pure lead has very good wetting characteristics with lubricating oil, and hence if there is any oil at all available a complete oil film is maintained between the bearing and the shaft. Moreover even when dry, lead has a relatively low coefficient of friction with steel, of which the shaft is composed, and hence the bearing can carry its load for a short period of time without critical failure after stoppage of the oil supply.

The present invention makes it safe to use a lining of pure, soft lead, because the thin film of lead lies over a finished surface of the underlying alloy, which surface is of itself sufficiently smooth to serve as a relatively efficient bearing surface. Furthermore the thickness of the lead film is only a fraction of the normal clearance (one-third in the example illustrated in Fig. 2) between shaft and bearing. Hence should any extreme conditions develop under which the film of lead is squeezed or worn from the bearing, the underlying bearing surface could assume the load without a detrimental increase in bearing clearance, and the engine would be able to continue functioning until a repair station is reached.

While the invention has been illustrated as applied to cylindrical bearings having bearing metal composed of silver-lead or copper-lead alloys, it should be understood that any variation of these alloys or any suitable bearing alloy containing lead may be used as a base for the electrolytic lead film. And it should also be understood it can be applied to any lead-containing bearing regardless of its shape, and that the improved bearings can be used in a wide variety of devices.

I claim:

1. In a bearing of the type having a layer of lead overlying a layer of lead-containing bearing alloy, the improvement which comprises: a finished bearing surface on the bearing alloy; and a thin film of electrolytic lead of uniform thickness covering the finished surface of the bearing alloy, said lead film having a molecularly continuous surface and being molecularly continuous with lead portions of the bearing alloy.

2. In a bearing of the type having a layer of lead overlying a layer of copper-lead bearing alloy, the improvement which comprises: a finished bearing surface on the copper-lead bearing alloy; and a thin film of electrolytic lead of uniform thickness covering the finished surface of the bearing alloy, said lead film having a molecularly continuous surface and being molecularly continuous with lead portions of the bearing alloy.

3. A bearing comprising: a layer of silver-lead bearing alloy having a finished surface; and a thin film of electrolytic lead of uniform thickness covering the finished surface of the bearing alloy, said lead film having a molecularly continuous surface and being molecularly continuous with lead portions of the bearing alloy.

4. In a combined structure in which a bearing surrounds a shaft, the bearing comprising a layer of lead overlying a layer of lead-containing bearing alloy, the improvement which comprises: a finished bearing surface on the bearing alloy conforming in contour with the shaft and of such size as to have a normal clearance plus a slight additional clearance; and a thin film of electrolytic lead of uniform thickness covering the finished surface of the bearing alloy and filling said additional clearance, the lead film having a molecularly continuous surface and being molecularly continuous with lead portions of the bearing alloy and constituting a smooth surface without the necessity of any machining operation prior to installation.

5. In a combined structure in which a bearing surrounds a shaft, the bearing comprising a layer of lead overlying a layer of lead-containing bearing alloy, the improvement which comprises: a finished bearing surface on the bearing alloy conforming in contour with the shaft and of such size as to have a normal clearance plus an additional clearance approximately one-third the size of the normal clearance; and a thin film of electrolytic lead of a uniform thickness equal to the size of said additional clearance, the lead film having a molecularly continuous surface and being molecularly continuous with lead portions of the bearing alloy and constituting a smooth surface without the necessity of any machining operation prior to installation.

6. In a combined structure in which a bearing surrounds a shaft, the bearing comprising a layer of lead overlying a layer of copper-lead bearing alloy, the improvement which comprises: a finished bearing surface on the bearing alloy conforming in contour with the shaft and of such size as to have a normal clearance plus a slight additional clearance; and a thin film of electrolytic lead of uniform thickness covering the finished surface of the bearing alloy and filling said additional clearance, the lead film having a molecularly continuous surface and being molecularly continuous with lead portions of the bearing alloy and constituting a smooth surface without the necessity of any machining operation prior to installation.

7. In a combined structure in which a bearing surrounds a shaft, the bearing comprising a layer of lead overlying a layer of silver-lead bearing alloy, the improvement which comprises: a finished bearing surface on the bearing alloy conforming in contour with the shaft and of such size as to have a normal clearance plus a slight additional clearance; and a thin film of electrolytic lead of uniform thickness covering the finished surface of the bearing alloy and filling said additional clearance, the lead film having a molecularly continuous surface and being molecularly continuous with lead portions of the bearing alloy and constituting a smooth surface without the necessity of any machining operation prior to installation.

WILLIAM E. McCULLOUGH.